United States Patent Office 3,437,703
Patented Apr. 8, 1969

3,437,703
CATALYTIC DEHYDROGENATION PROCESS AND COMPOSITIONS
Ronald E. Reitmeier, Middletown, Ky., and Franklin D. Mayfield and James H. Mayes, Baton Rouge, La.; said Reitmeier and said Mayfield assignors to Foster Grant Co., Inc., Leominster, Mass., a corporation of Delaware
No Drawing. Filed May 5, 1966, Ser. No. 561,303
Int. Cl. C07c 5/18, 15/00
U.S. Cl. 260—669    8 Claims

ABSTRACT OF THE DISCLOSURE

Hydrocarbons are dehydrogenated in the presence of oxygen and steam with a catalyst selected from iron oxide, magnesia and calcium nickel phosphate in combination with a platinum or palladium oxidation catalyst.

---

This invention relates to a process for the catalytic dehydrogenation of hydrocarbons and to a novel catalyst, therefor. More particularly, this invention relates to a process and catalyst system for the preparation of styrene which is particularly suited for dehydrogenation of ethylbenzene in the presence of oxygen or the like.

Catalytic dehydrogenation is a well-known and important technique for the conversion of hydrocarbons derived from petroleum, natural gas or coal, to a chemical entity which can more readily be used by the chemical processing industries as a starting material in the production of olefins and diolefins for polymerization to plastics and rubber products. Exemplary are the dehydrogenation of ethylbenzene to styrene and n-butenes to butadiene.

The evolution of dehydrogenation technology first involved development of a process utilizing catalyst which would produce the desired olefinic compound. Usually these catalysts were a metal or a mixture of metals of Groups IV to VIII of the periodic system of the elements and were either in their free form or in the form of their oxide, sulfide, phosphate, or other compound. These early catalysts frequently had to be regenerated, necessitating expensive equipment shut-downs. This inconvenience led to the development of the so-called autoregenerative catalysts. Exemplary of such systems are the widely used alkaline promoted catalysts known as Shell Development Company 105 catalyst and Standard Oil 1707-w catalyst. Synthetic Rubber, Wiley, New York 1954, fully discusses these and other prior art dehydrogenation catalysts for example at pages 150 et. seq.

However, even the autoregenerative catalysts, the advantages of which cause them to be widely used commercially, have certain shortcomings. For example, conversions are still lower than desired and attempts to vary processing conditions to increase conversions have resulted in completely unsatisfactory yields. (As used herein the term "conversion" is the weight percent of product produced less the weight percent of such product in the feed, and "yield" is the weight percent of product produced based on the amount of starting material destroyed.) Also catalyst poisoning continues to be a major problem, along with the loss of activity of the catalyst, necessitating periodic replacement. Furthermore the adiabatic reaction systems required by the endothermic nature of dehydrogenation, have resulted in expensive processing design solutions to overcome the problem of lowered conversions resulting from the wide temperature drops encountered in such systems.

Since the feasibility of a given dehydrogenation process often depends on very small production margin and in view of the foregoing problems, there continues to be a substantial research concentration in the area of catalytic dehydrogenation technology. Any change in the catalyst system or in processing technique which would result in an improved process providing a solution to one or more of the above problem would be a most significant contribution to this technology.

It is a primary object of this invention to provide such a process. It is also an object to provide a novel catalyst system, therefor. Another object is to provide a process which increases conversions at a given temperature level. A further object is to provide a novel catalyst system which is autoregenerative. A still further object of this invention is the provision of a dehydrogenation process which minimizes the temperature drop through the reaction zone.

These and the other objects of this invention are accomplished by dehydrogenating, in the presence of oxygen, a hydrocarbon, generally a commercially significant mono-olefin, such as butene-1 or an alkylated aromatic compound, such as ethylbenzene, by contacting said hydrocarbon with a catalyst system comprising a dehydrogenation catalyst and a conversion promoting amount of a platinum or palladium oxidation catalyst.

A preferred embodiment of this invention involves the incorporation of a conversion promoting amount of a platinum or palladium oxidation catalyst (hereinafter referred to at times as merely the "oxidation catalyst") and oxygen into the catalyst bed of a dehydrogenation system, wherein a heated mixture of a hydrocarbon and steam is passed over a dehydrogenating catalyst bed, said oxygen being present during contact of said heated mixture with the oxidation catalyst.

The dehydrogenation catalyst component may be any prior art dehydrogenation catalyst, such as those discussed above, or, for example, those set forth in U.S. Patents 2,414,585; 2,426,829; 2,870,228; 2,945,960; 3,084,125. The oxidation catalyst component includes platinum and palladium—both in their elemental form, including colloidal forms, and in the form of their catalytically effective compounds, generally the soluble salts. Exemplary of such compounds, are the halides, such as palladium chloride, platinum chlorides and the corresponding bromides and fluorides; nitrates, such as platinum or palladium nitrate; oxides, such as palladium oxide, or dioxide, platinum oxide or platinum dioxide; sulfate, such as palladium sulfate or platinum sulfate; complexes of platinum group metals, and the like. Palladium is preferred in the process of this invention and palladium dichloride has been found to be especially preferred.

Within the scope of this invention and forming another embodiment thereof is a novel catalyst composition comprising a dehydrogenation catalyst and a platinum or palladium oxidation catalyst, as defined hereinabove. Such a catalyst system has been found to be most useful in the dehydrogenation of hydrocarbons in the presence of oxygen (or other oxygen providing materials suitable as substitutes for oxygen—which are understood to be included within the meaning of the term "oxygen" as herein used) and other components normally found in the feed and/or product streams of a dehydrogenation reaction systems. Exemplary of the foregoing is a catalyst system, suitable for the dehydrogenation of hydrocarbons in the presence of oxygen and steam, which comprises (1) a major amount of a metal containing dehydrogenation catalyst, capable of converting a saturated carbon-to-carbon bond to an olefinic linkage by dehydrogenation, and (2) a minor, but conversion promoting amount of a platinum or palladium oxidation catalyst.

A preferred embodiment of this invention is a catalyst system, suitable for the dehydrogenation of ethylbenzene in the presence of oxygen and steam, which comprises a minor, but conversion promoting, amount of palladium dichloride and a dehydrogenation catalyst consisting essentially of a major amount of an iron oxide, a minor amount of an alkaline compound of potassium, generally potassium oxide or carbonate, and a minor amount of a chromium oxide. Illustrative of such a dehydrogenation catalyst is the well-known Shell–105 catalyst (see U.S. 2,408,140), with or without such additional promoters as an oxide of vanadium.

Thus, it can be seen that the catalyst compositions of this invention are formed from two known types of catalysts, a dehydrogenation catalyst and a platinum or palladium oxidation catalyst, and therefore, are binary in nature. The latter may be also referred to as an ignition catalyst.

The following example more fully demonstrates the process and novel catalysts of this invention. In this example, the preparation of styrene from ethylbenzene, in the absence of oxygen and using a commercially available dehydrogenation catalyst, is compared with a repeat run employing oxygen and the same dehydrogenation catalyst in combination with a palladium oxidation catalyst. The parts and percentages in this and all the following examples are by weight.

EXAMPLE I

A. Dehydrogenation catalyst without oxygen

Into a adiabatic fixed bed reactor, wherein the catalyst bed consists of Shell–105 catalyst (87–90% $Fe_2O_3$, 2–3% $Cr_2O_3$, 8–10% $K_2O$) in $3/16''$ pellets of cylindrical shape, provided with means for introducing air (or oxygen-bearing gas) through conventional spargers at the catalyst bed inlet points, one-third and two-thirds the bed depth into the catalyst zone, is fed a mixture of about 33% ethylbenzene and about 67% steam by weight. At an inlet temperature of 1146° F. and a liquid hourly space velocity of 0.33 lb./hr./lb., of catalyst, 33.1% of the ethylbenzene is converted to styrene. In this experiment, no air or oxygen-bearing gas is used.

B. Dehydrogenation catalyst—Ignition catalyst—Oxygen

The above run is repeated at a substantially similar temperature, within the control limits of the system (1120° F.), with the following exceptions:

(1) The catalyst bed consists of Shell–105 catalyst, as used hereinabove, with a palladium ignition catalyst (0.1% elemental palladium as the chloride, on an inert support of $½''$ alumina spheres as a carrier-elemental palladium content as a percent of total ignition catalyst weight) distributed uniformly throughout the bed in a ratio of approximately 6 parts of Shell–105 to 1 part of ignition catalyst.

(2) Air, at ambient temperature, is injected into the catalyst bed inlet at about 5–7% by weight of the total steam and hydrocarbon, and additional air into the catalyst bed sparger at about 1% by weight of the total steam and hydrocarbon. Using this system, 51.6% of the ethylbenzene is converted to styrene, a 56% increase of conversion over the run set paragraph A, computed as follows:

$$\left(\frac{51.6-33.1}{33.1}\times 100\right)$$

Example I utilized a catalyst bed wherein the ignition catalyst is dispersed uniformly throughout. This can be referred to as a homogeneous system. In the following example, however, the ignition catalyst is positioned in layers sandwiched between beds of the dehydrogenation catalyst and, therefore, is referred to as a multibed system.

EXAMPLE II

A. Dehydrogenation catalyst—no oxygen

An adiabatic fixed bed reactor wherein the catalyst bed consists of $3/16''$ pellets of cylindrical shape, Shell–105 catalyst (87–90% $Fe_2O_3$, 2–3% $Cr_2O_3$, 8–10% $K_2O$), is provided with means for introducing air (or oxygen-bearing gas) through conventional spargers at the catalyst bed inlet points, one-third and two-thirds the bed depth into the catalyst zone. A mixture of ethylbenzene and steam (in a ratio of 30% to 70% by weight is fed into the reactor), at an inlet temperature of 1067° F., and a liquid hourly space velocity of 0.3 lb./hr./lb., whereupon 22.5% of the ethylbenzene is converted to styrene. In this experiment, no air or oxygen-bearing gas is used.

B. Dehydrogenation catalyst—Ignition catalyst—Oxygen

Example II–A is repeated with the following exceptions:

(1) The catalyst bed consists of the Shell–105 catalyst described above, with an ignition catalyst as described in Example I–B placed in the bed in equal parallel layers at sparger points in a ratio of approximately 6 parts of Shell–105 catalyst to 1 part of ignition catalyst.

(2) Inlet temperature is 1050° F.

(3) Air is injected into each ignition catalyst layer at about 2.5%–3.5% by weight of the total steam and hydrocarbon.

Thereby, 29.9% of ethylbenzene is converted to styrene, a 30% increase of conversion over the run in Example II–A computed as follows:

$$\left(\frac{29.9-22.5}{22.5}\times 100\right)$$

(It should be noted that this increase occurred at 17° F. lower inlet temperature.)

The following examples demonstrate the use of other catalyst systems of this invention, as well as the dehydrogenation of other hydrocarbons.

EXAMPLE III

Example I–B is repeated using a platinum ignition catalyst (0.1% platinum, as $PtCl_4$, on $½''$ alumina spheres), instead of the palladium ignition catalyst employed therein. An enhanced conversion is likewise obtained.

EXAMPLE IV

An adiabatic multibed, fixed bed reactor, as described in Example II with the exception that a mixture of about 20% butene-1 and about 80% steam are employed. Inlet temperature is 1200° F. and a liquid hourly space velocity of 0.3 lb./hr./lb. is used. Air is injected into the ignition catalyst layers at about 2.5%–3.5% by weight of total steam and hydrocarbon. Significant conversions of the butene feed to butadiene are thereby obtained.

EXAMPLE V

The process of Example II–B is repeated, with the exception, that the multibed catalyst consists of a dehydrogenation catalyst of the calcium nickel phosphate-type, described in U.S. Patent 2,442,320 and having the following chemical analysis: nickel, 5.0%; calcium, 30.3%; phosphate radical, 53.2%; chromic oxide, 2.9%; graphite, 2.4%. Also, the amount of the oxidation catalyst employed in Example II–B is used. Good hydrocarbon conversions are obtained using the foregoing binary catalyst system.

The above experiments can be repeated using butane, butylene, diethylbenzene, ethyltoluene and ethylnaphthalene, as well as halogenated alkyl aromatics, such as chloroethylbenzene, bromoethylbenzene and the like, instead of ethylbenzene, employing appropriate dehydrogenation temperatures and conditions well understood by those having skill in the art. Furthermore, the above experiments can be repeated, employing other commercially available dehydrogenation catalysts such as the so-called "high zinc" catalysts containing a major mount of zinc oxide, or other alkaline promoted iron oxide or magnesium oxide types.

Although most of the experimental work utilizing the catalysts of this invention, showing higher conversions, were performed in adiabatic reactors (Examples I and II), the subject invention is not limited to adiabatic systems. This invention also has significant advantages when conducted in an isothermal unit and, therefore, the process can be carried out in a conventional isothermal fixed bed reactor.

From the foregoing examples, it is seen that the catalytic dehydrogenation process of this invention utilizing the described novel catalyst system provides significant advantages. Firstly, for example in adiabatic systems, higher conversions are obtainable. A further advantage is that the heat input of the pre-heat step normally utilized in commercial dehydrogenation reactions (e.g., see U.S. Patent 2,831,907), can be substantially decreased, resulting in significant savings. Another advantage is that the process of this invention is believed to provide a lowering of the hydrogen pressure in the reactor with the concomitant advantages. By virtue of the above and other advantages, the capacity of existing equipment to produce the desired dehydrogenation products is increased and furthermore there is a comparatively lower equipment capital investment as for example with regard to reaction product separation equipment (due to the increased ease of separation resulting from increased content of styrene, butadiene, etc., as the case may be).

The dehydrogenation catalyst and the oxidation catalyst components of the binary catalyst system of this invention can be contacted with the reactant stream as a fixed bed catalyst wherein the oxidation catalyst is, e.g., sandwiched between at least one of the intermediate layers in a multilayer catalyst bed, and, generally, two approximately equal beds of the dehydrogenation catalyst. It is therein presently preferred that the oxidation catalyst be positioned at an oxygen inlet. However, good results can be obtained by mixing the oxidation catalyst throughout the dehydrogenation catalyst bed, or the dehydrogenation catalyst can be impregnated with about 0.05% to 1%, preferably 0.1% of the ignition catalyst. (The foregoing is the percentage of total weight of catalyst system based on the weight of the elemental metal content of the ignition catalyst component.) A fluid bed reactor can also be used.

In general, the oxidation catalyst contains between about 0.01% to 2.5% of elemental platinum or palladium (based on the total weight of the oxidation catalyst, including the inert support) and preferably, about 0.1%. Higher metal contents could be employed, however, economics dictate that as little of the expensive metal be employed as possible.

The ratio of ignition catalyst to dehydrogenation catalyst is, of course, that ratio which is effective and usually falls within the general range of 1:3 to 1:10 and preferably about 1:6. Again, economics and also design of a specific system prescribes the ultimate ratio.

The method of preparation of the catalysts is not critical. For example, the separate components may be ball-milled or otherwise mixed with a small amount of water formed into pellets and dried, or catalysts may be prepared by means of co-precipitation of solutions of reagents wherein the precipitate is convertible to the desired components of the catalysts or by impregnating the iron oxide with the other components. Also non-critical are the shape and size of the catalyst particles. For example, the catalyst may be in the form of pellets, powder, pills, spheres, saddles, etc. Cylindrical pellets of $\frac{1}{16}$ to $\frac{3}{4}$ inch diameter and $\frac{1}{16}$ to 1 inch length are considered very satisfactory. It has been found that calcination of the iron oxide, either prior or subsequent to mixing with the other components for at least one hour and preferably several hours at a temperature of 550–1050° C. is usually beneficial to the activity of the catalyst.

Although a wide variety of prior art dehydrogenation catalysts can be employed in the process of this invention, it is generally preferred to employ a dehydrogenation catalyst which comprises a major quantity (i.e., 50–90%) of either iron oxide, zinc oxide, or magnesium oxide, a minor quantity of chromium and/or copper salts, and an alkali or alkaline promoter, such as an alkaline compound of potassium. Of the iron oxide based catalysts, it is preferred to employ at least 35% (by weight) of an iron oxide, having a degree of oxidation from $Fe_3O_4$ to $Fe_2O_3$, calculated as $Fe_2O_3$; at least 1% of a compound of potassium, which is at least partially convertible to potassium carbonate under the conditions of the process of this invention, and the remainder being an oxide of a heavy metal, more difficultly reducible than iron oxide, such as Cr, Mn, Al, Mg and the like. Illustrative of such iron based catalysts is one comprising (by weight) 80%–95% iron oxide, about 2%–5% chromium oxide and about 3%–15% potassium oxide. Illustrative of magnesium-based catalysts is a catalyst comprising about 60%–80% MgO, about 10%–30% of an iron oxide, about 1%–10% of a stabilizer, such as CuO, and about 1–10% of an alkaline promoter, such as $K_2O$. A preferred zinc-based catalyst is 70%–85% zinc oxide, 5%–10% aluminum oxide, 1%–10% calcium oxide, 1%–5% potassium hydroxide, or other potassium promoter, and 1%–5% chromic oxide.

As has previously been shown, the binary catalyst systems and process of this invention are applicable to various hydrocarbon feedstock, suitable for dehydrogenation processing. Thus, a feedstock containing for example, aliphatic and aromatic hydrocarbons from about 2 to about 20 carbons, preferably 4 to 12 carbons, and including acyclic and alicyclic paraffinic and olefinic hydrocarbons, can be employed herein. The feedstock may be a single hydrocarbon, such as the lower-alkylated aromatics, diethylbenzene, isopropylbenzene, ethyltoluene, ethylnaphthalene, and ethylchlorobenzene; the acylic paraffins, ethane, i-butane, n-butane, propane, hexane, heptane, and the like; the alicyclic paraffins, e.g. cyclobutane, cyclohexane, cyclopentane, ethylcyclohexane; olefins, such as, the butenes, the pentenes, the hexenes and branch chain derivatives and mixtures thereof; diolefins, and cyclic olefins, e.g., cyclobutene, cyclopentene, ethylcyclohexene, i-propylchlorocyclohexane, cyclo-octadiene, and the like. The feedstock may also be mixtures of single hydrocarbons, including various petroleum fractions, such as light naphtha (e.g. boiling range of about 100°–250° F.), heavy naphtha (e.g., boiling range of about 200°–400° F.), gas oil (e.g., boiling range of about 400°–700° F.), as well as mineral oils, crude petroleum, including topped and residual oils, refinery gases, and the like.

The catalysts of this invention generally consist of catalytic amounts of the dehydrogenation and ignition catalysts on a suitable inert support, preferably alumina or silica. Other conventional catalytic supports, for example, Portland cements, bauxite, diatomaceous earths, zirconia; refractory materials, such as HW, chrome castible cement and the like.

The present method can be operated within any effective range, e.g., in the general range of 0.5 lb. or somewhat less of steam to as high as 20 pounds, or even more, per pound of hydrocarbon. The limits are set by the necessity of having enough steam present to insure a favorable shift in the equilibrium of the water-gas reaction, so the catalyst regeneration continues, and by the practicalities, such as economy of operation. The preferred range is from about one to three pounds of steam per pound of hydrocarbon.

This invention allows rapid space velocities to be employed, permitting relatively small reactors and catalyst inventories to be used. For example, liquid hourly space velocities (expressed as lb. hydrocarbon/hr. per lb. reactor catalyst/hr.) ranging up to about 0.7 or higher can be employed while still obtaining reasonable conversions. Space velocities of about 0.25–0.35 generally produce excellent conversions and are therefore preferred.

For the purposes of this invention, the oxygen employed can be supplied as pure oxygen, air, or in the form of an oxygen-containing compound, i.e., $H_2O_2$, or other combined form which will provide free or molecular oxygen during the dehydrogenation reaction. Careful control of oxygen concentration is most desirable. Therefore, it is preferred to dilute pure oxygen or air when an inert or substantially inert diluent, such as nitrogen, steam and the like. Maintenance of proper oxygen concentrations for the desired cycle time will naturally depend upon the feedstock, temperature, pressure and space velocity, but generally falls within a range of about 0.01 to 10 mole percent of total process steam. The mole ratio of inert diluent to oxygen ranges, in most cases, from about 10 to 20, or more moles of diluent gas per mole of molecular oxygen.

The process of the present invention can be conducted under conventional dehydrogenation temperatures and pressures, exact conditions being dependent on feedstock and desired product. Thus, the temperature will be about 1000° F., to about 1200° F., preferably 1100° to 1150° F. The pressure will range from about 0.05 to about 100 p.s.i.g., preferably about 0.1 to 15. The reaction may also be carried out at reduced pressures or inert diluents can be employed to reduce the partial pressure of the feed below atmospheric.

We claim:

1. In the dehydrogenation of a hydrocarbon by passing a heated mixture of the hydrocarbon and steam over a dehydrogenating catalyst bed comprising a dehydrogenating catalyst of which the major component is selected from the class consisting of iron oxide, magnesia, and calcium nickel phosphate, the improvement wherein a conversion-promoting amount of a platinum or palladium oxidation catalyst and oxygen are incorporated into said catalyst bed, oxygen being present during contact of said heated mixture with the platinum group catalyst.

2. The method of claim 1 wherein said catalyst bed comprises a dehydrogenation catalyst having iron oxide as the major component.

3. The method of claim 1 wherein said catalyst bed comprises a dehydrogenation catalyst having magnesia as the major component.

4. The method of claim 1 wherein said catalyst bed comprises a dehydrogenation catalyst having calcium nickel phosphate as the major component.

5. The method of dehydrogenating ethylbenzene, which comprises mixing said hydrocarbon with steam, said hydrocarbon and steam each being at a temperature lower than dehydrogenation temperature prior to mixing, heating the mixture to a temperature within the range required for dehydrogenation, and contacting said heated mixture in the presence of oxygen and while at dehydrogenation temperature with a catalyst system comprising an effective amount of a dehydrogenation catalyst consisting essentially of a major amount of iron oxide, a minor amount of an alkaline compound of potassium, and a minor amount of chromium oxide, and a conversion promoting amount of an oxidation catalyst selected from the group consisting of elemental palladium and palladium chloride.

6. A catalyst system, suitable for the dehydrogenation of hydrocarbons in the presence of oxygen and steam, comprising a dehydrogenation catalyst which contains a major amount of calcium nickel phosphate and is capable of converting a saturated carbon-to-carbon bond to an olefinic linkage by dehydrogenation, and a minor, but catalytically promoting amount of a platinum or palladium oxidation ignition catalyst.

7. A catalyst system, suitable for the dehydrogenation of ethylbenzene in the presence of oxygen and steam, which comprises a conversion promoting amount of palladium dichloride and an effective amount of a dehydrogenation catalyst consisting essentially of about 80–95% of an iron oxide, about 1–4% of an alkaline compound of potassium and about 3–6% of a chromium oxide, said percentages being on a weight basis.

8. The catalyst system of claim 7 wherein said dehydrogenation catalyst consists essentially of about 93% $Fe_2O_3$, 5% $Cr_2O_3$ and 2% $K_2O$.

References Cited

UNITED STATES PATENTS

| | | | |
|---|---|---|---|
| 2,831,907 | 4/1958 | Mayfield et al. | 260—669 |
| 2,851,502 | 9/1958 | Bowman et al. | 260—669 |
| 3,168,587 | 2/1965 | Michaels et al. | 260—680 |
| 3,260,767 | 7/1966 | Bajars | 260—680 |
| 3,304,150 | 2/1967 | Stover et al. | 252—474 |

DELBERT E. GANTZ, *Primary Examiner.*

CURTIS R. DAVIS, *Assistant Examiner.*

U.S. Cl. X.R.

252—472, 474; 260—680, 683.3